(12) United States Patent
Zhang et al.

(10) Patent No.: US 11,531,229 B2
(45) Date of Patent: Dec. 20, 2022

(54) DISPLAY PANEL, DISPLAY APPARATUS AND ELECTRONIC DEVICE

(71) Applicants: BEIJING BOE DISPLAY TECHNOLOGY CO., LTD., Beijing (CN); BOE TECHNOLOGY GROUP CO., LTD., Beijing (CN)

(72) Inventors: Yu Zhang, Beijing (CN); Zhanchang Bu, Beijing (CN); Shixin Geng, Beijing (CN)

(73) Assignees: BEIJING BOE DISPLAY TECHNOLOGY CO., LTD., Beijing (CN); BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 17/329,224

(22) Filed: May 25, 2021

(65) Prior Publication Data
US 2022/0050326 A1    Feb. 17, 2022

(30) Foreign Application Priority Data
Aug. 17, 2020 (CN) .......................... 202010825130.4

(51) Int. Cl.
*G02F 1/1335* (2006.01)
(52) U.S. Cl.
CPC .. *G02F 1/133514* (2013.01); *G02F 1/133512* (2013.01)
(58) Field of Classification Search
None
See application file for complete search history.

(56) References Cited

U.S. PATENT DOCUMENTS

| | | | | |
|---|---|---|---|---|
| 2007/0064422 A1* | 3/2007 | Murai | ................ | G09G 3/3413 362/231 |
| 2008/0224968 A1* | 9/2008 | Kashiwabara | ....... | G09G 3/3225 345/83 |
| 2011/0156575 A1* | 6/2011 | Yu | ........................ | C09K 11/565 313/503 |
| 2012/0256938 A1* | 10/2012 | So | ........................ | G09G 3/3208 345/589 |
| 2016/0040854 A1* | 2/2016 | Zhang | .................... | F21V 14/06 257/89 |

(Continued)

FOREIGN PATENT DOCUMENTS

CN          107505760 A  * 12/2017   ....... G02F 1/133512

*Primary Examiner* — Shan Liu
(74) *Attorney, Agent, or Firm* — Dority & Manning, P.A.

(57) ABSTRACT

A display panel has a plurality of pixel units. Each pixel unit includes a first blue sub-pixel and a second blue sub-pixel. The display panel includes a color filter substrate. The color filter substrate includes a plurality of filter groups. Each filter group includes a first blue filter disposed in a corresponding first blue sub-pixel and a second blue filter disposed in a corresponding second blue sub-pixel. The first blue filter is configured to transmit a first waveband light, and the second blue filter is configured to transmit a second waveband light. A wavelength corresponding to a first peak of the first waveband light is less than a wavelength corresponding to a second peak of the second waveband light. An intensity of the first waveband light emitted from the first blue sub-pixel is less than an intensity of the second waveband light emitted from the second blue sub-pixel.

15 Claims, 4 Drawing Sheets

(56) References Cited

U.S. PATENT DOCUMENTS

2016/0091642 A1* 3/2016 Sakaigawa ............. G02B 5/201
    349/65
2019/0041699 A1* 2/2019 David ............... G02F 1/133617

* cited by examiner

DISPLAY PANEL, DISPLAY APPARATUS AND ELECTRONIC DEVICE

CROSS-REFERENCE TO RELATED APPLICATION

This application claims priority to Chinese Patent Application No. 202010825130.4, filed on Aug. 17, 2020, which is incorporated herein by reference in its entirety.

TECHNICAL FIELD

The present disclosure relates to display technologies, and in particular, to a display panel, a display apparatus and an electronic device.

BACKGROUND

With continuous progress of display technologies, demands of users for display apparatuses have continuously increased. Thin film transistor liquid crystal displays (TFT-LCDs) have been developed by leaps and bounds in recent years due to their characteristics such as low power consumption, low cost and no radiation. In a manufacturing process of a liquid crystal display, a color filter substrate and an array substrate are connected together to form a liquid crystal display panel through an assembling process, and then the liquid crystal display panel is disposed into a frame together with a backlight module.

SUMMARY

In one aspect, a display panel is provided. The display panel has a plurality of pixel units, and each pixel unit includes a first blue sub-pixel and a second blue sub-pixel. The display panel includes a color filter substrate including a plurality of filter groups. Each filter group is disposed in a corresponding pixel unit, and the filter group includes a first blue filter and a second blue filter. The first blue filter is disposed in a first blue sub-pixel of the corresponding pixel unit, and the second blue filter is disposed in a second blue sub-pixel of the corresponding pixel unit. The first blue filter is configured to transmit a first waveband light, the second blue filter is configured to transmit a second waveband light. A wavelength corresponding to a first peak of the first waveband light is less than a wavelength corresponding to a second peak of the second waveband light, and an intensity of the first waveband light emitted from the first blue sub-pixel is less than an intensity of the second waveband light emitted from the second blue sub-pixel.

In some embodiments, a first light transmittance of the first blue filter for the first waveband light is less than a second light transmittance of the second blue filter for the second waveband light.

In some embodiments, a thickness of the first blue filter is greater than a thickness of the second blue filter.

In some embodiments, a ratio of constituents of the first blue filter is different from a ratio of constituents of the second blue filter.

In some embodiments, a ratio of the first light transmittance to the second light transmittance is in a range of 0.42 to 0.75.

In some embodiments, the first blue sub-pixel and the second blue sub-pixel are configured such that, when an image pixel corresponding to the pixel unit is displayed, a driving voltage of the first blue sub-pixel is less than a driving voltage of the second blue sub-pixel.

In some embodiments, a sum of the intensity of the transmitted first waveband light and the intensity of the transmitted second waveband light is substantially equal to a target light intensity, and the target light intensity is a light intensity corresponding to a blue component value required by the pixel unit for displaying a corresponding image pixel.

In some embodiments, the pixel unit further includes a red sub-pixel and a green sub-pixel, and the filter group further includes a red filter disposed in the red sub-pixel, and a green filter disposed in the green sub-pixel. An area of the red filter, an area of the green filter, and a sum of areas of the first blue filter and the second blue filter are substantially equal.

In some embodiments, the areas of the first blue filter and the second blue filter are substantially equal.

In some embodiments, the first blue sub-pixel and the second blue sub-pixel are adjacent. The pixel unit further includes a red sub-pixel and a green sub-pixel, and the filter group further includes a red filter disposed in the red sub-pixel, and a green filter disposed in the green sub-pixel. The red filter, the green filter, the first blue filter, and the second blue filter are arranged in a first direction, and the first direction is a row direction or a column direction of an array of the plurality of pixel units.

In some embodiments, a ratio of the intensity of the transmitted first waveband light to the intensity of the transmitted second waveband light is in a range of 0.42 to 0.75.

In some embodiments, the first waveband light is of wavelengths greater than 400 nm and less than 455 nm; and the second waveband light is of wavelengths greater than or equal to 455 nm, and less than 500 nm.

In some embodiments, the first blue filter has a maximum light transmittance for light with a wavelength of 445 nm, and the second blue filter has a maximum light transmittance for light with a wavelength of 460 nm.

In some embodiments, the pixel unit further includes a red sub-pixel and a green sub-pixel, and the filter group further includes a red filter disposed in the red sub-pixel, and a green filter disposed in the green sub-pixel. The color filter substrate further includes a black matrix layer, and the black matrix layer includes a plurality of openings. The red filter, the green filter, the first blue filter and the second blue filter are each disposed in a respective opening.

In another aspect, a display apparatus including the above display panel is provided.

In some embodiments, the display panel further includes an array substrate disposed on a side of the color filter substrate. The display apparatus further includes a backlight module, and the backlight module is disposed on a side of the array substrate away from the color filter substrate. The backlight module includes a plurality of light-emitting diodes, and each light-emitting diode includes a first light-emitting chip and a second light-emitting chip. The first light-emitting chip is configured to emit the first waveband light, and the second light-emitting chip is configured to emit the second waveband light.

In yet another aspect, an electronic device including the above display apparatus is provided.

BRIEF DESCRIPTION OF THE DRAWINGS

In order to describe technical solutions in the present disclosure more clearly, accompanying drawings to be used in some embodiments of the present disclosure will be introduced briefly below. However, the accompanying drawings to be described below are merely accompanying drawings of some embodiments of the present disclosure, and a person of ordinary skill in the art can obtain other drawings according to these drawings. In addition, the accompanying drawings to be described below may be regarded as schematic diagrams, and are not limitations on actual sizes of products, an actual process of a method and actual timings of signals to which the embodiments of the present disclosure relate.

By reading the following detailed description with reference to the accompanying drawings, the above and other objects, features and advantages of exemplary embodiments of the present disclosure will become easy to understand. In the accompanying drawings, a number of embodiments of the present disclosure are shown in an exemplary and unlimited manner, and same or corresponding reference signs indicate same or corresponding parts.

DETAILED DESCRIPTION

Figure 1:
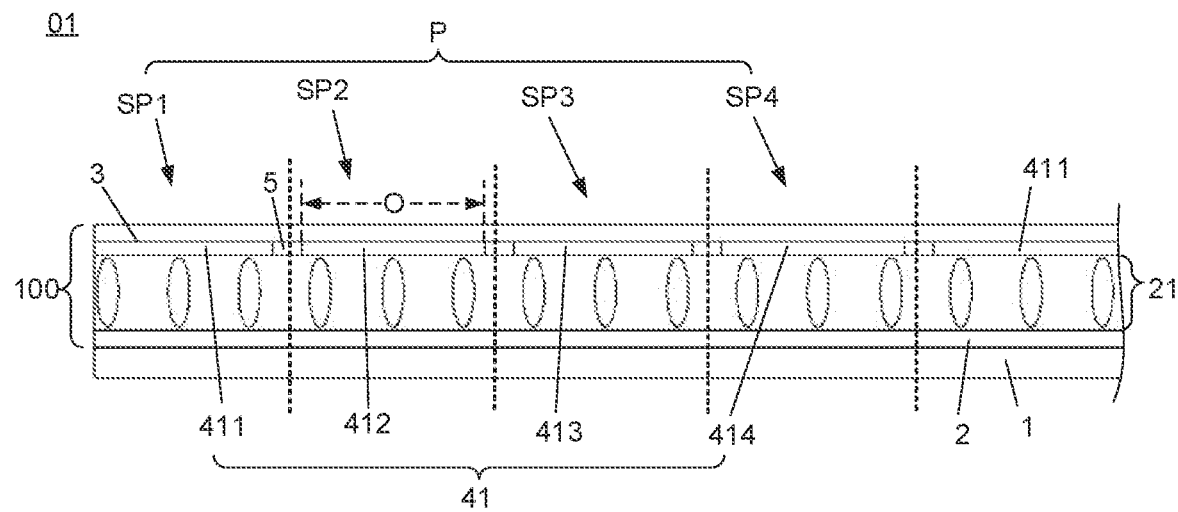
FIG. 1 is a schematic section of a display apparatus, in accordance with some embodiments.

Technical solutions in some embodiments of the present disclosure will be described clearly and completely with reference to the accompanying drawings below. However, the described embodiments are merely some but not all embodiments of the present disclosure. All other embodiments obtained by a person of ordinary skill in the art based on the embodiments of the present disclosure shall be included in the protection scope of the present disclosure.

Unless the context requires otherwise, the term "comprise" and other forms thereof such as the third-person singular form "comprises" and the present participle form "comprising" throughout the description and the claims are construed as open and inclusive, i.e., "inclusive, but not limited to". In the description, the terms such as "one embodiment", "some embodiments", "exemplary embodiments", "example", "specific example" or "some examples" are intended to indicate that specific features, structures, materials or characteristics related to the embodiment(s) or example(s) are included in at least one embodiment or example of the present disclosure. Schematic representations of the above terms do not necessarily refer to the same embodiment(s) or example(s). In addition, the specific features, structures, materials or characteristics may be included in any one or more embodiments or examples in any suitable manner.

Hereinafter, the terms "first" and "second" are used for descriptive purposes only, and are not to be construed as indicating or implying the relative importance or implicitly indicating the number of indicated technical features, Thus, features defined as "first" and "second" may explicitly or implicitly include one or more of the features. In the description of the embodiments of the present disclosure, the term "a plurality of" means two or more unless otherwise specified.

The phrase "A and/or B" includes the following three combinations: only A, only B, and a combination of A and B.

The term "approximately" or "substantially" as used herein includes a stated value and an average value in an acceptable range of deviation of a particular value. The acceptable range of deviation is determined by a person of ordinary skill in the art in view of measurement in question and errors associated with measurement of a particular quantity (i.e., limitations of a measurement system).

As used herein, the term "a plurality of" includes two and more than two.

Nowadays, people often need to stare at display screens in their daily life and work. When a display screen displays an image, light emitted by the display screen includes blue light, and the blue light includes short wavelength blue light and long wavelength blue light. The short wavelength blue light has high energy and may be used to maintain stability of brightness of the display screen. However, the short wavelength blue light may cause an increase of toxins in macular regions of human eyes, which may produce photochemical damage to the human eyes. For example, a user who stares at the display screen for a long time is prone to suffer from eyestrain. The long wavelength blue light has low energy and may be used to maintain stability of chromaticity of the display screen, and the long wavelength blue light does less harm to human eyes when compared with the short wavelength blue light. Therefore, by reducing an overall intensity of the blue light or increasing a proportion of the long wavelength blue light, it is possible to reduce the harm of the short wavelength blue light to human eyes.

However, reduction of the overall intensity of the blue light may cause the image displayed on the display screen to have a yellow color cast. For the approach of increasing the proportion of the long wavelength blue light, since the long wavelength blue light has low energy, an increased power consumption of the display screen may be caused, thereby decreasing a light-emitting efficiency of the display screen. In addition, increasing the proportion of the long wavelength blue light may also decrease reliability and stability of the display screen.

Figure 2:
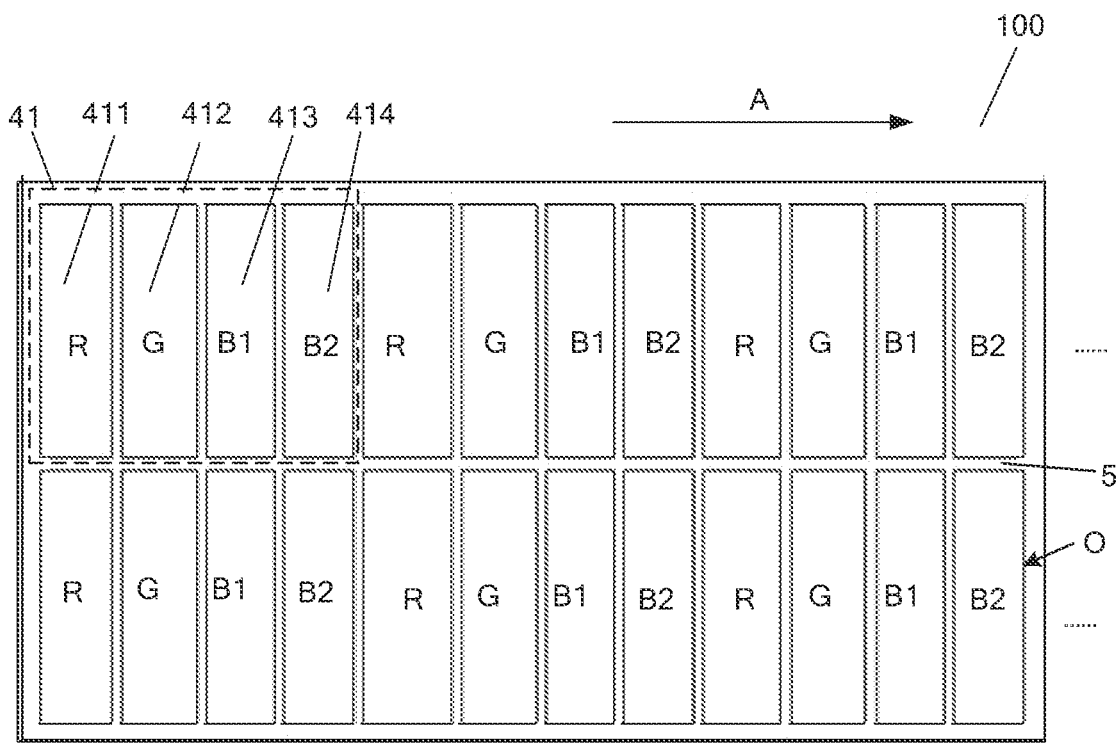
FIG. 2 is a schematic top view of a color filter substrate, in accordance with some embodiments.

Some embodiments of the present disclosure provide a display panel. Referring to FIGS. 1 and 2, the display panel 100 has a plurality of pixel units P arranged periodically. Each pixel unit P includes a red sub-pixel SP1, a green sub-pixel SP2, a first blue sub-pixel SP3, and a second blue sub-pixel SP4.

The display panel 100 includes an array substrate 2, a color filter substrate 3, and a liquid crystal layer 21 disposed between the array substrate 2 and the color filter substrate 3. The liquid crystal layer 21 includes liquid crystal molecules.

For example, the array substrate 2 includes a plurality of driver circuits arranged in an array. Each sub-pixel includes a respective one of the driver circuits, and the driver circuit can control a part of the liquid crystal molecules corresponding to the sub-pixel to deflect to a certain angle, according to a corresponding driving voltage. Accordingly, an intensity of light emitted from the sub-pixel can be adjusted. Herein, the driving voltage is an across voltage between a pixel electrode of the sub-pixel and a common electrode of the display panel 100.

Here, the color filter substrate 3 can filter light (usually white light) passing through the liquid crystal layer 21, and allow light of specific colors to pass. In this way, the array substrate 2 cooperates with the color filter substrate 3 to make each sub-pixel emit light of a corresponding color and with a corresponding brightness, and the display panel 100 may display a corresponding image by mixing light emitted from the plurality of sub-pixels.

Figure 6:
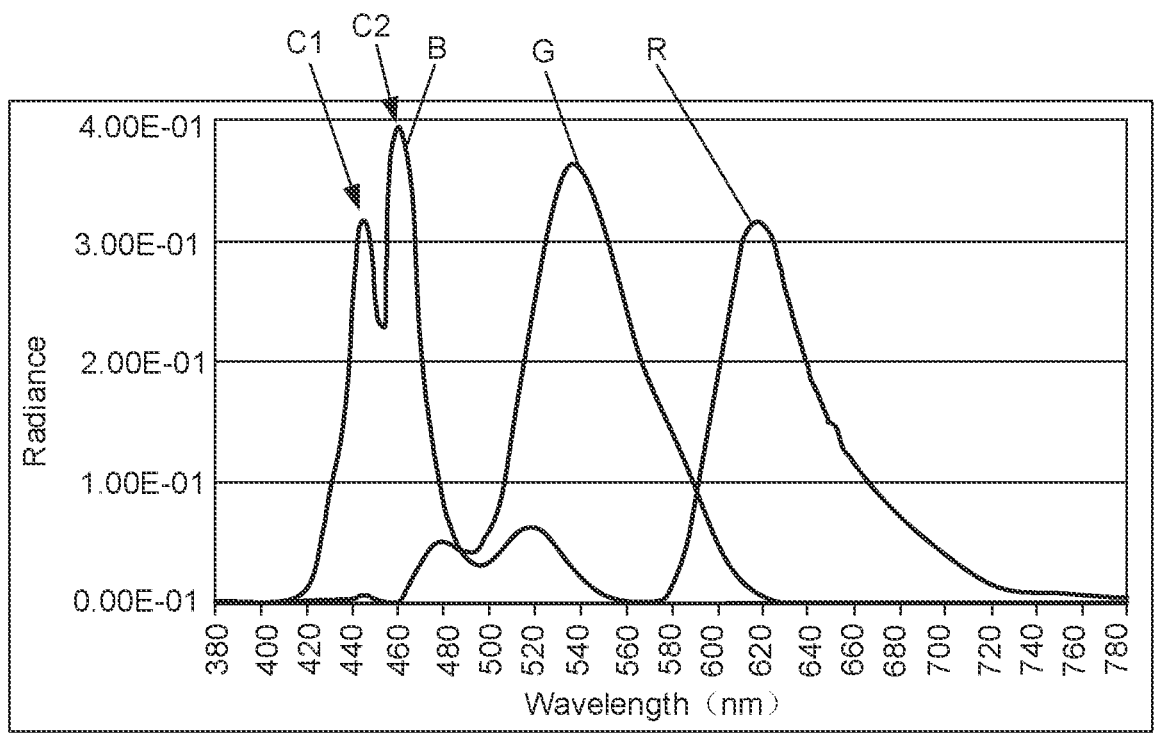
FIG. 6 is a spectrum diagram of light emitted by a display panel, in accordance with some embodiments.

The color filter substrate 3 includes a plurality of filter groups 41, and each filter group 41 is disposed in a corresponding pixel unit R The filter group 41 includes a first blue filter 413 disposed in a corresponding first blue sub-pixel SP3, and a second blue filter 414 disposed in a corresponding second blue sub-pixel SP4. The first blue filter 413 is configured to transmit a first waveband light, and the second blue filter 414 is configured to transmit a second waveband light. Referring to FIG. 6, the first waveband light has a first peak C1, and the second waveband light a second peak C2. A wavelength of light corresponding to the first peak C1 is smaller than a wavelength of light corresponding to the second peak C2, An intensity of the first waveband light transmitted by the first blue filter 413 is smaller than an intensity of the second waveband light transmitted by the second blue filter 414.

For example, in the pixel unit P, a ratio of the intensity of the transmitted first waveband light to the intensity of the transmitted second waveband light is in a range of 0.42 to 0.75.

For example, the first waveband light is of wavelengths greater than 400 nm and less than 455 nm; the second waveband light is of wavelengths greater than or equal to 455 nm, and less than 500 nm. It will be noted that, according to a definition of low blue light by TUV Rheinland, blue light with a wavelength less than 455 nm is defined as harmful blue light, and blue light with a wavelength greater than or equal to 455 nm is defined as harmless blue light. That is to say, in the display panel 100, the first waveband light may be harmful to human eyes, and the second waveband light may be harmless to human eyes.

For example, the wavelength corresponding to the first peak C1 of the first waveband light is 445 nm, and the wavelength corresponding to the second peak C2 of the second waveband light is 460 nm. In this case, the first blue filter 413 has a maximum transmittance for light with a wavelength of 445 nm, and the second blue filter 414 has a maximum transmittance for light with a wavelength of 460 nm. It will be noted that, the first peak C1 corresponds to a maximum amplitude of the first waveband, and the second peak C2 corresponds to a maximum amplitude of the second waveband. For example, in the spectrum shown in FIG. 6, in a waveband with a wavelength range of 400 nm to 455 nm, a portion corresponding to a wavelength of 445 nm has a maximum amplitude; and in a waveband with a wavelength range of 455 nm to 500 nm, a portion corresponding to a wavelength of 460 nm has another maximum amplitude.

Figure 4:
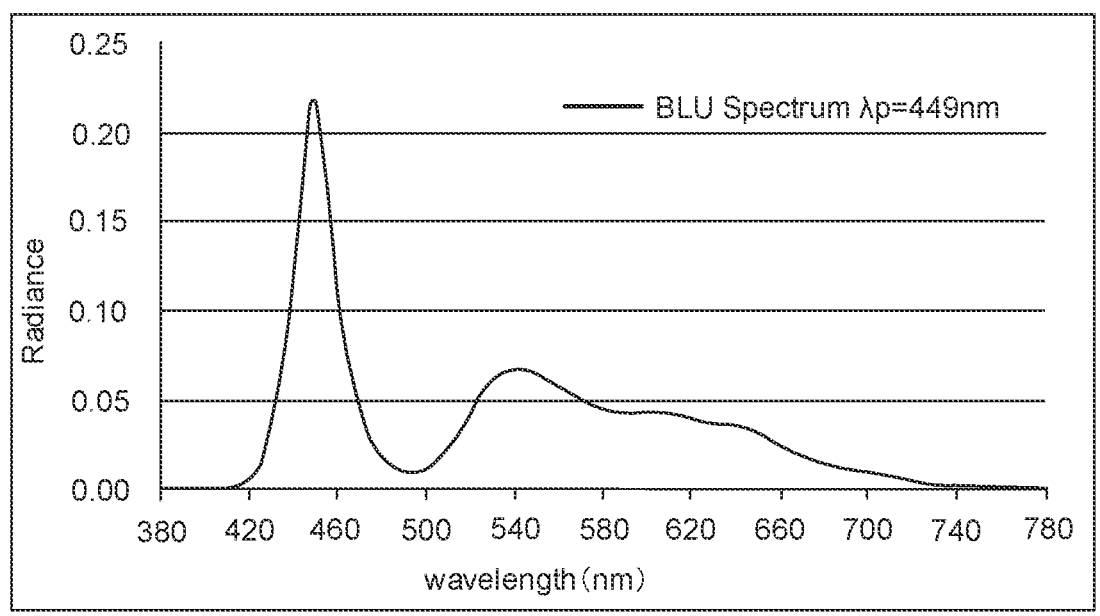
FIG. 4 is a spectrum diagram of light emitted by a backlight, in accordance with the prior art.
Figure 5:
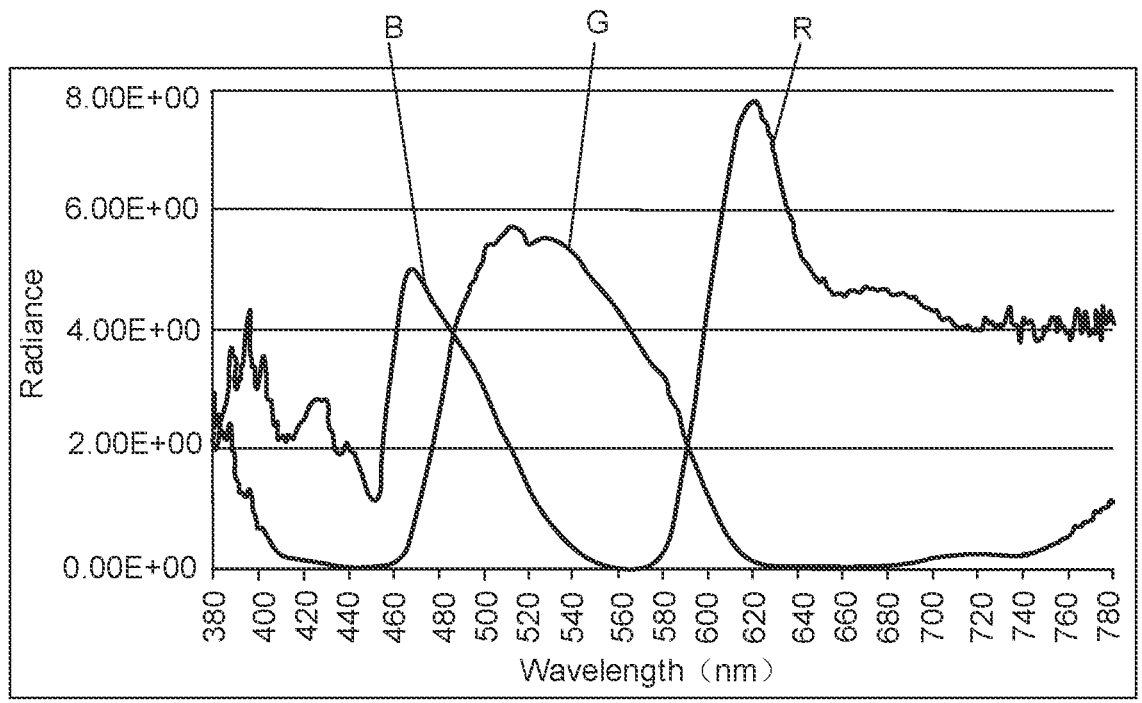
FIG. 5 is a spectrum diagram of light emitted by a display panel, in accordance with the prior art.

A spectrum of a light-emitting diode (LED) chip of an LED in a back light unit (abbreviated as BLU) is shown in FIG. 4, and an intensity of the blue light with a wavelength range of 380 nm to 440 nm is low. Referring to FIG. 5, R, G and B in the figure are spectra of red, green and blue light emitted by a display panel in the prior art, respectively. In addition, referring to a corresponding value on the ordinate (i.e., Radiance), compared with the red light and the green light, a radiation capability of light at a peak of the blue light is poor when compared with light at peaks of the red light and the green light. For example, in the spectrum of the BLU in FIG. 4, a radiation capability of the light in the waveband with the wavelength range of 380 nm to 440 nm is poor, which causes noise in a spectrum of light emitted from a color filter substrate of the display panel during simulation. Accordingly, light transmittance of a blue filter needs to be improved to ensure a sufficient intensity of the blue light in principle.

However, for the display panel 100 provided by some embodiments of the present disclosure, referring to a spectrum of light passing through the color filter substrate 3 shown in FIG. 6, a radiation capability of blue light with a wavelength range of 440 nm to 454 nm (i.e., the first waveband light) gradually decreases to a minimum value (corresponding to a trough between the two peaks C1 and C2), so that an intensity of the short wavelength blue light may be reduced, and the harmful short wavelength blue light may be effectively reduced. In a waveband from the trough to the second peak C2, a radiation capability of blue light with a wavelength range greater than 455 nm gradually rises to a maximum value (corresponding to the second peak C2), which indicates that an intensity of the harmless long wavelength blue light gradually increases. Thus, a spectrum of light emitted by the display panel 100 is a blue light spectrum with double-peak, i.e., a short wavelength high energy peak and a long wavelength low energy peak. As a result, the display panel 100 may not only use the short wavelength blue light to maintain stability of brightness, but also use the long wavelength blue light to maintain stability of chromaticity. Accordingly, the display panel 100 may protect a user's eyes from the harmful short wavelength blue light without affecting the display effect.

In the display panel 100, the pixel unit P includes two blue sub-pixels, i.e., the first blue sub-pixel SP3 and the second blue sub-pixel SP4. Therefore, the blue light emitted from the pixel unit P includes two types of blue light; the first waveband light with a relatively short wavelength (i.e., the short wavelength blue light) and the second waveband light with a relatively long wavelength (i.e., the long wavelength blue light). Here, the short wavelength blue light may maintain the brightness of the blue light, thereby avoiding a color cast on the display panel 100. Moreover, since the intensity of the short wavelength blue light is lower than that of the long wavelength blue light, the short wavelength blue light may also reduce a proportion thereof in the blue light emitted by the display panel 100, and reduce harm to the human eyes, Therefore, the display panel 100 may not only prevent the color cast but also reduce the harm of the blue light to the human eyes.

It will be noted that, the red sub-pixel SP1 and the green sub-pixel SP2 are also each provided with a filter. For example, referring to FIG. 2, the filter group 41 further includes a red filter 411 disposed in a corresponding red sub-pixel SP1, and a green filter 412 disposed in a corresponding green sub-pixel SP2. In this way, the red sub-pixel SP1 may emit red light, and the green sub-pixel SP2 may emit green light. Sub-pixels of different colors in a same pixel unit P emit light of different colors, and the colors are mixed, so that the pixel unit P may display a corresponding image pixel, which enables the display panel 100 to display a specific image. Herein, the image pixel refers to a smallest unit that constitutes the image displayed by the display panel 100.

Materials of the filters (which may also be referred to as color resist layers) include at least pigments. For example, a pigment in the red filter 411 may include, a cyanide pigment and/or an anthraquinone pigment; a pigment in the green filter 411 may include halogenated phthalocyanine; and a pigment in the first blue filter 413 and the second blue filter 414 may include copper phthalocyanine pigment. Here, filtering light with different wavelengths may be achieved by adjusting particle sizes, particle distributions and chromaticities of the pigments. For example, by adjusting particle sizes of the copper phthalocyanine pigment, the wavelengths of the light that the first blue filter 413 and/or the second blue filter 414 can transmit may be altered.

In some embodiments, a sum of the intensity of the first waveband light transmitted by the first blue filter 413 and the intensity of the second waveband light transmitted by the second blue filter 414 is substantially equal to a target light intensity. Here, the target light intensity is a light intensity corresponding to a blue component value of the pixel unit P required by the image pixel to be displayed by the pixel unit P.

For example, in a frame, a red component value of the pixel unit P is 25, a blue component value of the pixel unit P is 50, and a green component value of the pixel unit P is 150. Then, a sum of intensities of blue light emitted from the first blue sub-pixel SP3 and the second blue sub-pixel SP4 in the pixel unit P makes the blue component value of the pixel unit P 50.

In this way, on a premise that intensities of red light emitted from a corresponding red sub-pixel SP1 and green light emitted from a corresponding green sub-pixel SP2 are constant, it is possible to ensure that the red light, the green light, and the blue light (which is emitted from the first blue sub-pixel SP3 and the second blue sub-pixel SP4) still follow a certain light mixing rule.

By adjusting light transmittances of the filters, or by adjusting driving voltages for the corresponding sub-pixels, the intensity of the first waveband light that can be transmitted by the first blue filter 413 may be smaller than that of the second waveband light that can be transmitted by the second blue filter 414. The above two methods will be exemplarily described below.

In some embodiments, a first light transmittance of the first blue filter 413 for the first waveband light is smaller than a second light transmittance of the second blue filter 414 for the second waveband light. For example, a ratio of the first light transmittance for the second light transmittance is in a range of 0.42 to 0.75. For example, the ratio of the first light transmittance for the second light transmittance is 0.4, 0.5, 0.6, 0.7, or 0.75.

Here, in a case where the ratio of the first light transmittance for the second light transmittance is less than 0.42, the intensity of the blue light may be insufficient, which may cause a color cast; and in a case where the ratio is greater than 0.75, the harm of the blue light may not be effectively reduced. In a case where the ratio of the first light transmittance for the second light transmittance is in the range of 0.42 to 0.75, the display panel 100 may reduce the harm of the blue light effectively without causing the color cast.

It will be noted that, referring to certification standards of TUV Rheinland for the low blue light, in a case where the ratio of the intensity of the first waveband light transmitted by the first blue filter 413 to the intensity of the second waveband light transmitted by the second blue filter 414 is in the range of 0.42 to 0.75, when light of different colors transmitted by the red filter 411, the green filter 412, the first blue filter 413 and the second blue filter 414 have a same luminosity (not a same intensity), they can produce white light after being mixed. That is to say, in the above range, it is possible to ensure that a total intensity of the blue light transmitted by the first blue filter 413 and the second blue filter 414 is substantially the same as the intensity of the blue light corresponding to the required blue component value and thus the light mixing rule adopted by the display panel 100 may not be altered.

In addition, there is a linear relationship between the light transmittance and the intensity of the emitted light. Therefore, in a case where an intensity of light incident on each filter is certain, and driving voltages of the first blue sub-pixel SP3 and the second blue sub-pixel SP4 are equal, that is, in a case where the intensity of the light incident on the first blue filter 413 and the second blue filter 414 via the liquid crystal layer 21 are the same, the ratio of the intensity of the first waveband light emitted from the first blue filter 413 to the intensity of the second waveband light emitted from the second blue filter 414 is substantially equal to the ratio between the light transmittances of the two blue filters 413 and 414.

It will be understood that, in a case where the intensity of the incident light is constant, the thickness of the filter is inversely proportional to the light transmittance thereof. Consequently, the larger the thickness of the filter is, the smaller the light transmittance thereof is. On this basis, for example, a thickness of the first blue filter 413 is greater than a thickness of the second blue filter 414. In this way, by setting the thickness of the first blue filter 413 to be greater than that of the second blue filter 414, the light transmittance of the first blue filter 413 for the first waveband light may be made smaller than the light transmittance of the second blue filter 414 for the second waveband light.

In some embodiments, in addition to the pigments, the materials for forming the filters further include a polymer resin, a solvent, a photoactive compound (PAC) and an additive. Here, the polymer resin has etching resistance; the solvent helps the materials for forming the filters remain in a liquid state, which facilitates coating; the photoactive compound is used to make the materials for forming the filters sensitive to light, electron beams, ion beams or the like, so as to make the materials generate a curing reaction; and characteristics of the filters may change, as an amount of the additive added changes.

Here, the light transmittances of the first blue filter 413 and the second blue filter 414 may be adjusted by adjusting ratios of constituents thereof. For example, in the display panel 100, a ratio of constituents of the first blue filter 413 is different from that of the second blue filter 414. For example, a distribution of pigment particles may change as a weight ratio of the additive added changes. Accordingly, a light absorption rate of the filter may be changed, which may change light transmittance of the filter. For another example, the light transmittance of the filter may be changed by adjusting a ratio of the photoactive compound to the additive in the materials. It will be understood that, the light transmittance of the filter may also be adjusted by adjusting ratio(s) between other compositions, which is not limited here.

In some embodiments, the first blue sub-pixel SP3 and the second blue sub-pixel SP4 are configured such that, when the image pixel corresponding to the pixel unit P is displayed, the driving voltage for the first blue sub-pixel SP3 is smaller than the driving voltage for the second blue sub-pixel SP4. For example, by adjusting voltages on pixel electrodes of the two blue sub-pixels, the driving voltage for the first blue sub-pixel SP3 may be made smaller than the driving voltage for the second blue sub-pixel SP4.

In some embodiments, in a case where the pixel unit P further includes the red sub-pixel SP1 and the green sub-pixel SP2, and the filter group 41 further includes the red filter 411 and the green filter 412, an area of the red filter 411, an area of the green filter 412, and a sum of areas of the first blue filter 413 and the second blue filter 414 are substantially equal. In this case, light-emitting areas of the sub-pixels of the three colors are equal, which is conducive to the color mixing effect.

On this basis, for example, the areas of the first blue filter 413 and the second blue filter 414 are substantially equal. That is to say, an area ratio of the red filter 411, the green filter 412, the first blue filter 423, and the second blue filter 414 is 2:2:1:1.

Figure 3:
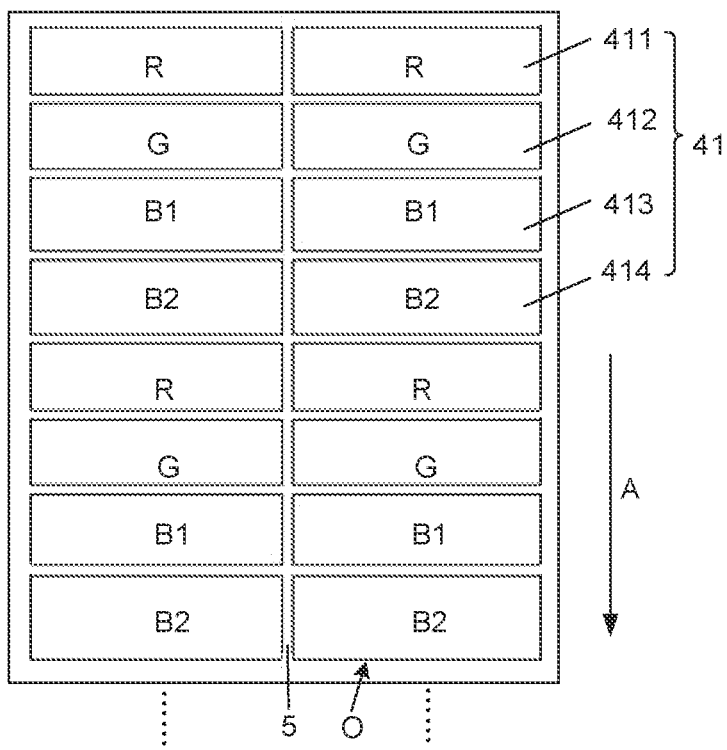
FIG. 3 is a schematic top view of another color filter substrate, in accordance with some embodiments.

In some embodiments, as shown in FIGS. 2 and 3, in the pixel unit P, the red sub-pixel SP1, the green sub-pixel SP2, the first blue sub-pixel SP3, and the second blue sub-pixel SP4 are arranged in a first direction A, and the first blue sub-pixel SP3 and the second blue sub-pixel SP4 are adjacent. The first direction A is a row direction or a column direction of an array formed by the plurality of pixel units P. Here, positions of the first blue sub-pixel SP3 and the second blue sub-pixel SP4 may be interchanged, which is not limited here.

In this way, the two blue sub-pixels are arranged adjacently, which may ensure that a distance between each blue sub-pixel and the sub-pixel of another color (i.e., the red sub-pixel SP1 or the green sub-pixel SP2) is substantially the same, thereby ensuring a uniform color mixing of the blue light, the red light and the green light, and improving display effect of the display panel 100.

For example, an arrangement of the red filter 411, the green filter 412, the first blue filter 413, and the second blue filter 414 in each filter group 41 is the same.

For example, referring to FIG. 2, taking an example in which the first direction A is the row direction of the plurality of pixel units P, in a case where the first direction A is parallel to a length direction of the display panel 100, the red filter 411, the green filter 412, the first blue filter 413, and the second blue filter 414 are sequentially disposed in the length direction of the display panel 100. Here, positions of the first blue filter 413 and the second blue filter 414 may be interchanged.

For another example, referring to FIG. 3, taking an example in which the first direction A is the column direction of the plurality of pixel units F, in a case where the first direction A is parallel to a width direction of the display panel 100, the red filter 411, the green filter 412, the first blue filter 413, and the second blue filter 414 are sequentially disposed in the width direction of the display panel 100. Here, the positions of the first blue filter 413 and the second blue filter 414 may be interchanged.

In some embodiments, referring to FIGS. 1 to 3, the color filter substrate 3 further includes a black matrix layer 5 that has an orthographic projection of a grid-like pattern, and the black matrix layer 5 forms a plurality of openings O in the color filter substrate 3. The red filter 411, the green filter 412, the first blue filter 413, and the second blue filter 414 are each disposed in a respective one of the openings O. In this way, the black matrix layer 5 separates the filters of different colors, so that light of different colors passes through these filters and is mixed at a distance over these filters. For example, the black matrix layer 5 is made of black photoresist.

In a manufacturing process of the filters, the red filter 411, the green filter 412, the first blue filter 413 and the second blue filter 414 may be formed by coating the materials for forming the filters in the openings O.

Some embodiments of the present disclosure provide a display apparatus 01. Referring to FIG. 1, the display apparatus 01 includes the display panel 100 described in the above embodiments, and for a specific structure and beneficial effects thereof, reference may be made to the description of the display panel 100 in the above embodiments, which will not be repeated here.

Figure 7:
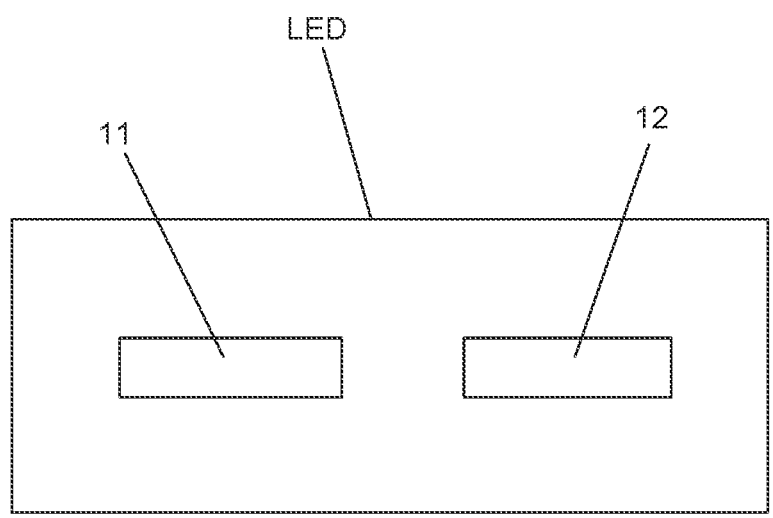
FIG. 7 is a schematic diagram of an LED, in accordance with some embodiments.

In some embodiments, referring to FIG. 1, the display apparatus 01 further includes a backlight module 1, and the backlight module 1 is disposed on a side of the array substrate 2 away from the color filter substrate 3 in the display panel. The backlight module 1 includes a plurality of light-emitting diodes (LEDs). As shown in FIG. 7, each LED includes a first light-emitting chip 11 and a second light-emitting chip 12. The first light-emitting chip 11 is configured to emit the first waveband light, and the second light-emitting chip 12 is configured to emit the second waveband light.

Here, the backlight module 1 may provide a light source for the display panel 100, so that the display apparatus 01 can display an image. For example, in addition to the plurality of LEDs, the backlight module 1 further includes a reflective sheet, a light guide plate, and optical films. They cooperate with the light source to provide uniform light for the display panel 100, so that the display apparatus 01 can display an image.

In this way, in the display apparatus 01 the LEDs in the backlight module 1 are LEDs with a dual-chip structure. Since the LEDs in the display apparatus 01 may emit the first waveband light (i.e., the short wavelength blue light) and the second waveband light (i.e., the long wavelength blue light), a spectrum of the blue light in light emitted by the LEDs may match the spectrum of the blue light transmitted by the color filter substrate 3 to a great degree, so that light transmittance of the color filter substrate 3 for the light emitted by the backlight module 1 can be improved, and the light emitted by the backlight module 1 is efficiently utilized, that is, the light-emitting efficiency of the display apparatus 01 is improved. Thus, the display apparatus 01 may not only decrease the harmful blue light, but also has low power consumption.

Some embodiments of the present disclosure provide an electronic device including the above display apparatus.

The display apparatus is the display apparatus described in the above embodiments, and for a specific structure and beneficial effects thereof, reference may be made to the description of the display panel 100 in the above embodiments, which will not be repeated here.

The foregoing descriptions are merely specific implementations of the present disclosure, but the protection scope of the present disclosure is not limited thereto, and any changes or replacements that a person skilled in the art could conceive of within the technical scope of the present disclosure shall be included in the protection scope of the present disclosure. Therefore, the protection scope of the present disclosure shall be subject to the protection scope of the claims.

What is claimed is:

1. A display panel having a plurality of pixel units, each pixel unit including a first blue sub-pixel and a second blue sub-pixel; the display panel comprising a color filter substrate including a plurality of filter groups, wherein each filter group is disposed in a corresponding pixel unit, and the filter group includes:
   a first blue filter disposed in a first blue sub-pixel of the corresponding pixel unit, the first blue filter being configured to transmit a first waveband light; and
   a second blue filter disposed in a second blue sub-pixel of the corresponding pixel unit, the second blue filter being configured to transmit a second waveband light, wherein
   a wavelength corresponding to a first peak of the first waveband light is less than a wavelength corresponding to a second peak of the second waveband light, and an intensity of the first waveband light emitted from the first blue sub-pixel is less than an intensity of the second waveband light emitted from the second blue sub-pixel;

the first waveband light is of wavelengths greater than 400 nm and less than 455 nm; and the second waveband light is of wavelengths greater than or equal to 455 nm, and less than 500 nm;

the first blue filter has a maximum light transmittance for light with a wavelength of 445 nm; and the second blue filter has a maximum light transmittance for light with a wavelength of 460 nm.

2. The display panel according to claim 1, wherein a first light transmittance of the first blue filter for the first waveband light is less than a second light transmittance of the second blue filter for the second waveband light.

3. The display panel according to claim 2, wherein a thickness of the first blue filter is greater than a thickness of the second blue filter.

4. The display panel according to claim 2, wherein a ratio of constituents of the first blue filter is different from a ratio of constituents of the second blue filter.

5. The display panel according to claim 2, wherein a ratio of the first light transmittance to the second light transmittance is in a range of 0.42 to 0.75.

6. The display panel according to claim 1, wherein the first blue sub-pixel and the second blue sub-pixel are configured such that, when an image pixel corresponding to the pixel unit is displayed, a driving voltage of the first blue sub-pixel is less than a driving voltage of the second blue sub-pixel.

7. The display panel according to claim 1, wherein a sum of the intensity of the transmitted first waveband light and the intensity of the transmitted second waveband light is substantially equal to a target light intensity, and the target light intensity is a light intensity corresponding to a blue component value required by the pixel unit for displaying a corresponding image pixel.

8. The display panel according to claim 1, wherein the pixel unit further includes:
a red sub-pixel; and
a green sub-pixel;
the filter group further includes:
a red filter disposed in the red sub-pixel; and
a green filter disposed in the green sub-pixel, wherein
an area of the red filter, an area of the green filter, and a sum of areas of the first blue filter and the second blue filter are substantially equal.

9. The display panel according to claim 8, wherein the areas of the first blue filter and the second blue filter are substantially equal.

10. The display panel according to claim 1, wherein the first blue sub-pixel and the second blue sub-pixel are adjacent;
the pixel unit further includes a red sub-pixel and a green sub-pixel; and
the filter group further includes a red filter disposed in the red sub-pixel, and a green filter disposed in the green sub-pixel, wherein
the red filter, the green filter, the first blue filter, and the second blue filter are arranged in a first direction, and the first direction is a row direction or a column direction of an array of the plurality of pixel units.

11. The display panel according to claim 1, wherein a ratio of the intensity of the transmitted first waveband light to the intensity of the transmitted second waveband light is in a range of 0.42 to 0.75.

12. The display panel according to claim 1, wherein the pixel unit further includes:
a red sub-pixel; and
a green sub-pixel;
the filter group further includes:
a red filter disposed in the red sub-pixel; and
a green filter disposed in the green sub-pixel; and
the color filter substrate further includes:
a black matrix layer, including a plurality of openings, wherein the red filter, the green filter, the first blue filter and the second blue filter are each disposed in a respective opening.

13. A display apparatus, comprising the display panel according to claim 1.

14. The display apparatus according to claim 13, wherein the display panel further includes an array substrate disposed on a side of the color filter substrate;
the display apparatus further comprises:
a backlight module, disposed on a side of the array substrate away from the color filter substrate, wherein the backlight module includes a plurality of light-emitting diodes, and each light-emitting diode includes:
a first light-emitting chip configured to emit the first waveband light; and
a second light-emitting chip configured to emit the second waveband light.

15. An electronic device, comprising the display apparatus according to claim 13.

* * * * *